United States Patent [11] 3,607,975

| [72] | Inventors | Tomomichi Tsukada<br>Kawasaki-shi;<br>Jiro Kano, Kawasaki-shi; Tetuzo Nakai,<br>Kawaguchi-shi, all of Japan |
|---|---|---|
| [21] | Appl. No. | 729,522 |
| [22] | Filed | May 16, 1968 |
| [45] | Patented | Sept. 21, 1971 |
| [73] | Assignee | Tokyo Shibaura Electric Co., Ltd.<br>Kawasaki-shi, Japan |
| [32] | Priority | June 9, 1967, Dec. 13, 1967 |
| [33] | | Japan |
| [31] | | 42/36509 and 42/79492 |

[54] ADHESIVE COMPOSITION
9 Claims, No Drawings

[52] U.S. Cl. .................................................. 260/850,
117/124 E, 117/132 A, 117/132 BF, 117/132 CB,
117/138.8 A, 117/138.8 B, 260/32.8 R, 260/32.8
A, 260/32.8 N, 260/39 R, 260/39 SB, 260/40 R,
260/852, 260/873
[51] Int. Cl. ........................................................ C08g 37/34
[50] Field of Search ............................................ 260/850, 39
M

[56] References Cited
UNITED STATES PATENTS

| 2,462,658 | 2/1949 | Moffett ...................... | 260/850 |
|---|---|---|---|
| 2,479,090 | 8/1949 | Wohnsiedler ................ | 260/850 |
| 2,683,100 | 7/1954 | Edgar et al. .................. | 260/850 |
| 2,730,459 | 1/1956 | Holmen et al. ................ | 260/850 |
| 2,859,188 | 11/1958 | Heider et al. ................. | 260/850 |
| 3,449,467 | 6/1969 | Wynstra ...................... | 260/850 |

FOREIGN PATENTS

| 559,963 | 7/1958 | Canada ....................... | 260/850 |

*Primary Examiner*—John C. Bleutge
*Attorney*—George B. Oujevolk

ABSTRACT: An adhesive composition which comprises a linear polyester-type polyethylene isophthalate, an amino compound containing an amino group of which a hydrogen atom is substituted by a functional methylol group, a curing catalyst and an oxide of a multivalent metal. When the adhesive composition is heated to cause curing, it will produce an adhesive layer having desirable physical properties of high-resistance to organic solvents and heat.

ADHESIVE COMPOSITION

The present invention relates to an adhesive composition mainly consisting of linear polyethylene isophthalate-type polyesters.

It is already known that the linear polyester of polyethylene isophthalate base is a good adhesive particularly for polyvinyl chloride or polyethylene terephthalate. Since the linear polyester has as high a surface electrical resistance of about $10^{15}$ ohm·cm., it is adapted for use as an adhesive in the manufacture of magnetic tape, laminated boards for a transformer or insulation coating for electric wiring. The linear polyester resin of polyethylene isophthalate base is generally prepared by subjecting to a condensation reaction a mixture of ethylene glycol and isophthalic acid or lower esters thereof or said acid or ester which has been partly replaced by terephthalic acid or by another acid resembling phathalic acid. Due to a thermoplastic nature, however, the linear polyester is softened when exposed to elevated temperatures, so that it cannot retain a bonding power under such condition. Furthermore, the linear polyester resin is known to have the drawbacks that is is readily subject to blocking (a tendency to become tacky even at normal temperature) and that it has poor resistance to many organic solvents.

Many attempts have been made to resolve such shortcomings of the linear polyethylene isophthalate type polyester. The most effective approach consisted in reacting the functional group of the linear polyester, namely, the hydroxyl or carboxyl group with the isocyanate or epoxy group contained in certain compounds so as to cross-link the polyester and form a reticular structure therein. Even the linear polyester thus cross-linked is still soluble in methyl ethyl ketone and trichloroethylene, so that is is not suitable for applications where the polyester is demanded to be resistant to these solvents.

The present invention provides an adhesive composition comprising a linear polyethylene isophthalate polyester, a solution consisting of an amino compound containing an amino group of which a hydrogen atom is substituted by a functional methylol group, a curing catalyst introduced into said solution and an oxide of multivalent metal dispersed therein.

When heated to temperatures beyond about 80° C., the adhesive composition of the present invention is cured to form an adhesive layer considerably resistant to methyl ethyl ketone or trichloroethylene. The adhesive layers prepared from the composition of the present invention have far greater heat resistance and bonding strength than those formed from the conventional cross-linked linear polyethylene isophthalate polyester according to the conventional process.

The linear polyester used in the present invention can be prepared by the known process of heating in the presence of a catalyst a mixture of ethylene glycol and isophthalic acid or lower alkyl esters thereof for condensation reaction. Otherwise it is procurable from the market. The method of the present invention also permits the use of polyethylene isophthalate prepared by subjecting to condensation reaction a mixture of polyethylene glycol and isophathalic acid or allyl esters thereof which have been partly replaced by other phthalic acids or esters thereof, such as phthalic acid, terephthalic acid or alkyl esters of terephthalic acid.

The amino compounds containing an amino group of which a hydrogen atom is substituted by a functional methylol group used in the present invention may consist of, for example, hexamethoxy methyl melamine, dimethylol urea, dimethyl ether, methylated trimethylol melamine, butylated methylol urea, butylated methylol melamine, thiourea resin, and guanidine resin. Such amino compounds may include lower alkyl ethers of the methylol group, say an alkoxyl group. It was found, to obtain the best results, that where these amino compounds are used in amounts of 0.5 to 50 percent by weight on the basis of the total quantity of said compounds and the linear polyester. It have been experimentally confirmed that where too small amounts of amino compounds are employed, the resultant adhesive layer will be reduced in stability to solvents and heat. Conversely where too large amounts of the amino compounds are added, the bonding strength of an adhesive composition will be deteriorated, and the resultant adhesive layer will be hardened and embrittled.

The examples of the curing catalyst used in the present invention include benzoyl peroxide, nucleus-replaced benzoyl peroxide, lauroyl peroxide, acetyl peroxide, peroxides of ketone, cumene hydroperoxides, t-butyl hydroperoxides, perboric acid, paratoluene sulfonic acid or ditertiary butyl peroxide. These curing catalysts may be used singly or in combination. The preferable amounts of curing catalyst are 0.01 to 5 percent by weight on the basis of the total weight of linear polyester and amino compounds used. The use of less than 0.01 percent of curing catalyst does not elevate the bonding force of an adhesive composition and the solvent resistance of an adhesive layer formed therefrom. On the other hand, the application of more than 5 percent by weight of curing catalyst neither substantially contributes to the improvement of the effect of such use nor ensures storage stability.

The multivalent metal oxide used in the present invention may consist of, for example, aluminum oxide, oxide magnesium oxide, or aluminosilicate. These multivalent metal oxides are employed in amounts ranging from 0.2 to 10 percent by weight on the basis of the total weight of linear polyesters and amino compounds used.

For improved tackiness, the adhesive composition of the present invention can further include butadiene-acrylonitrile copolymers containing carboxyl groups. The copolymer can be prepared by copolymerizing butadiene and acrylonitrile in the presence of carboxylic acid such as acrylic acid, methacrylic acid or maleic acid. It is also procurable from the market.

The adhesive composition of the present invention is a thermosetting-type, so that when heated to a temperature of 80° to 180° C., it will be cured to form an adhesive layer excellently stable to heat and solvents. Once cured, the adhesive layer is substantially insoluble in trichloroethylene and methyl ethyl ketone, and stable to a temperature up to about 240° C. Further, it has a bonding strength two to four times greater than the known adhesive agents of polyethylene isophthalate base. Such excellent properties of the adhesive composition according to the present invention promise wide industrial applications.

It is not fully understood by what reaction mechanism the adhesive composition of the present invention can upon thermal curing form an adhesive layer having such desirable properties as described above. However, it is believed that the functional hydroxyl group and/or carboxyl group contained in the linear polyester catalytically reacts with the amino group, imino group or functional methylol group of copresent amino compounds, and also that the remaining functional group of the linear polyester is catalytically chelated by copresent an oxide of multivalent metal, thus forming a three-dimensional reticular structure. Also where the adhesive composition includes a butadiene-acrylonitrile copolymer containing a carboxyl group, said copolymer will also play a part in the formation of the aforementioned reticular structure due to the action of the functional hydroxyl group contained therein. However, it will be understood that the present invention is not restricted in any way by the reaction mechanism referred to the above.

The present invention will be more clearly appreciated from the following examples in which all parts are by weight.

EXAMPLE 1

25 parts of polyethylene isophthalate were dissolved in 100 parts of methyl ethyl ketone. The polyethylene isophthalate was prepared by reacting polyethylene glycol with isophthalic acid by the known method. In the aforementioned solution were dissolved 6 parts of butylated urea resin. To the resultant solution were further added 0.5 part of light magnesium oxide and 0.2 part of cumene hydroperoxide, using a blender for uniform dispersion. The adhesive composition obtained has a viscosity of 1,000 centistokes at 25° C.

A portion of the composition was coated on a flat glass plate so as to form a layer 0.1 mm. thick (namely, 0.5 g. per 15 cm.² of the surface area of the glass plate), respectively. The layers were allowed to stand 30 minutes at a room temperature and dried for 30 minutes at 80° C., and further heated to 140° C. for varying lengths of time for coring. The cured adhesive layers were peeled off the glass plate to provide four kinds of samples for use in the solvent resistance test.

Another set of four kinds of samples was prepared as follows for use i the bonding strength test. A separate portion of the same adhesive composition was coated on one side of a copper foil and a film of polyethylene terephthalate, respectively. The coated foil and film were allowed to stand 30 minutes at room temperature, dried 10 minutes at 80° C. and, after being cooled to room temperature, were superposed in a manner to cause the coated surfaces to face each other. The adhesive composition was then cured at a pressure of 4 kg./cm.² applied from both sides of the superposed foil and film and a temperature of 140° C. for varying lengths of time. The physical properties of the adhesive layer thus cured are presented in Table 1 below.

TABLE 1.—PHYSICAL PROPERTIES OF CURED ADHESIVE LAYER

| | Curing time (min.) | Peel strength (kg./cm.) | Tensile* strength of coated adhesive layer (g./mm.²) | Solvent resistance** | |
|---|---|---|---|---|---|
| | | | | Methyl ethyl ketone | Trichloroethylene |
| Sample: | | | | | |
| 1 | 5 | 1.2 | 575 | Slightly affected | Slightly affected. |
| 2 | 10 | 1.1 | 520 | Not affected | Not affected. |
| 3 | 20 | 1.1 | 550 | ----do---- | Do. |
| 4 | 30 | 1.0 | 540 | ----do---- | Do. |

*Tensile strength of coated adhesive layer formed from each sample.
**Variations in the surface condition of a sample after it is immersed 12 hours in the respective solvents at 25° C.

EXAMPLE 2

25 parts of the same polyethylene isophthalate as was used in example 1 were dissolved in 100 parts of methyl ethyl ketone. In the solution were dissolved 6 parts of butylated melamine resin. In the solution thus obtained were uniformly dispersed using a blender 0.5 part of zinc oxide and 0.2 part of t-butyl hydroperoxide.

The adhesive composition thus prepared was put to the same tests as in example 1. A sample of this composition was measured to have a peel strength of 1.0 Kg./cm. when it was cured 20 minutes at 120° C. To determine solvent resistance, a cured adhesive layer was immersed 12 hours in methyl ethyl ketone and trichloroethylene respectively at 25° C., but did not change at all in said resistance.

EXAMPLE 3

25 parts of the same polyethylene isophthalate as was used in example 1 where dissolved in 100 parts of methyl ethyl ketone. In the solution were dissolved 6 parts of butylated urea resin. In the resultant solution were uniformly dispersed using a blender 0.3 part of aluminum oxide and 0.2 part of benzoyl oxide.

The adhesive composition thus prepared was put to the same tests as in example 1. A sample of this composition was measured to have a peel strength of more than 0.8 Kg./cm. When immersed 12 hours in methyl ethyl ketone and trichloroethylene respectively at 25° C., the sample displayed such excellent solvent resistance as only slightly changing in the surface condition.

EXAMPLE 4

25 parts of the same polyethylene isophthalate as was used in example 1 were dissolved in 100 parts of methyl ethyl ketone and further dissolved therein were 2 parts of methylated methylol melamine. In the solution thus obtained were uniformly dispersed using a blender 2/ parts of aluminosilicated and 1 part of cumene hydroperoxide. The results of the same tests as in example 1 indicated that the cured adhesive layer formed from the aforementioned composition was fully resistant to methyl ethyl ketone and trichloroethylene and had a peel strength of more than 0.9 Kg./cm.

EXAMPLE 5

25 parts of the same polyethylene isophthalate as was used in example 1 were dissolved in 100 parts of methyl ethyl ketone. In the solution were dissolved 1 part of methylated methylol melamine and 1 part of a butadiene-acrylonitrile copolymer containing a carboxyl group (its content 0.5 percent). In the solution thus obtained were uniformly dispersed using a blender 2 parts of aluminum oxide, and 1 part of cumene hydroperoxide. The same tests as in example 1 show that the cured adhesive layer formed from the aforesaid composition was insoluble in methyl ethyl ketone and trichloroethylene and had a peel strength of more than 1.5 Kg./cm.

EXAMPLE 6

25 parts of the same polyethylene isophthalate as was used in example 1 were dissolved in 100 parts of methyl ethyl ketone and further dissolved therein were 10 parts of butylated methylol melamine resin. In the solution thus obtained were uniformly dispersed using a blender 3.5 parts of zinc oxide and 1.4 parts of lauroyl peroxide. When dried and cured under the same conditions as in example 1, the adhesive layer formed from the composition was resistant to methyl ethyl ketone and trichloroethylene and had a peel strength of more than 0.8 Kg./cm.

EXAMPLE 7

50 parts of the same polyethylene isophthalate as was used in example 1 and 9 parts of a butadiene-acrylonitrile copolymer (containing 32 to 33 percent of acrylonitrile) which contains 0.5 percent of carboxyl group were kneaded on hot rolls at 150° C. To the kneadings were added 1 part of hexamethoxy methyl melamine and 200 parts of methyl ethyl ketone. In the mixture were uniformly dispersed using a blender 0.5 part of aluminum oxide and 0.1 part of paratoluene sulfonic acid. The adhesive composition thus prepared had a viscosity of 250 centistokes at 25° C. The same tests as in example 1 conducted on said composition gave the following results.

TABLE 2.—PHYSICAL PROPERTIES OF CURED ADHESIVE LAYER

| Sample: | Curing time (min.) | Peel strength (kg./cm.) | Tensile* strength of coated adhesive layer (g./mm.²) | Solvent resistance** | |
|---|---|---|---|---|---|
| | | | | Methyl ethyl ketone | Trichloroethylene |
| 5 | 5 | 1.5 | 750 | Slightly affected | Slightly affected. |
| 6 | 10 | 1.3 | 700 | Not affected | Not affected. |
| 7 | 20 | 1.0 | 680 | do | Do. |
| 8 | 30 | 1.0 | 670 | do | Do. |

EXAMPLE 8

50 parts of the same polyethylene isophthalate as was used in example 1 and 9 parts of a butadiene-acrylonitrile copolymer (containing 32 to 33 percent of acrylonitrile) which contains 0.5 percent of carboxyl group were kneaded on hot rolls at about 150° C. To the kneadings were added in a blender 3 parts of hexamethoxy methyl melamine and 200 parts of methyl ethyl ketone. The mass was fully stirred to form a uniform solution. There were uniformly dispersed in the solution, with stirring continued, 2 parts of magnesium oxide and 0.05 part of paratoluene sulfonic acid. The same tests as in example 1 indicate that when cured 10 to 30 minutes, all samples of the adhesive composition thus prepared has a peel strength of 1.3 Kg./cm. and displayed excellent resistance to both methyl ethyl ketone and trichloroethylene even though immersed 20 hours therein.

EXAMPLE 9

50 parts of the same polyethylene isophthalate as was used in example 1 and 9 parts of a butadiene-acrylonitrile copolymer (containing 32 to 33 percent of acrylonitrile which contains 0.5 percent of carboxyl group were kneaded under the same conditions as in example 7. To the kneadings were added in a blender 2 parts of hexamethoxy melamine, 0.1 part of benzoyl peroxide and 100 parts of methyl ethyl ketone, The cured adhesive layer formed from the aforementioned composition had a peel strength of 0.8 Kg./cm. and was fully resistant to methyl ethyl ketone and trichloroethylene.

While the invention has been described in connection with some preferred embodiments thereof, the invention is not limited thereto and includes any modifications and alterations which fall within the scope of the invention as defined in the appended claims.

What is claimed is:
1. An adhesive composition comprising:
   a. a linear polyethylene isophthalate;
   b. an amino compound selected from the group consisting of hexamethoxy methyl melamine; dimethylol ureadimethyl ether, methylated trimethylol melamine, butylated methylol urea, butylated methylol melamine, thiourea resin containing a methylol group, guanidine resin containing a methylol group, in amounts of about 0.5 to about 50 percent by weight on the basis of the total quantity of said compound and the linear polyester;
   c. a curing catalyst selected from the group consisting of benzoyl peroxide, nucleus-replaced benzoyl peroxide, lauroyl peroxide, acetyl peroxide, peroxide of methylethyl ketone, cumene hydroperoxides, t-butyl hydroperoxides, perboric acid, paratoluene sulfonic acid and ditertiary butyl peroxide used singly and in combination, in amounts of about 0.01 to about 5 percent by weight on the basis of the total weight of linear polyesters and amino compound; and,
   d. a multivalent metal oxide selected from the group consisting of aluminum oxide, magnesium oxide, aluminosilicate, silicon dioxide and zinc oxide in amounts ranging from about 0.2 to about 10 percent by weight on the basis of the total weight of linear polyesters and amino compounds used.

2. A composition as claimed in claim 1, wherein said amino compound butylated butylated methylol and and said metal oxide zinc magnesium oxide.

3. A composition as claimed in claim 1, wherein said amino compound is butylated melamine resin and said metal oxide is zinc oxide.

4. A composition as claimed in claim 1, wherein said amino compound is butylated methylol urea and said metal oxide is aluminum oxide.

5. A composition as claimed in claim 1, wherein said amino compound is methylated methylol melamine and said metal oxide is aluminosilicate.

6. A composition as claimed in claim 1, wherein said amino compound is methylated methylol melamine, said metal oxide is aluminum oxide and there is additionally about 1 part by weight of a butadiene-acrylonitrile copolymer containing about 0.5 percent of a carboxyl group.

7. A composition as claimed in claim 1, wherein there is additionally a butadiene-acrylonitrile copolymer having or the order of 33 percent acrylonitrile and containing about 0.5 percent of a carboxyl group.

8. A composition as claimed in claim 7, wherein the metal oxide is aluminum oxide.

9. The composition claimed in claim 7, wherein the metal oxide is magnesium oxide.